Oct. 29, 1929.  W. H. KATT  1,733,885
VEHICLE SIGNAL DEVICE
Filed Feb. 18, 1927  2 Sheets-Sheet 1
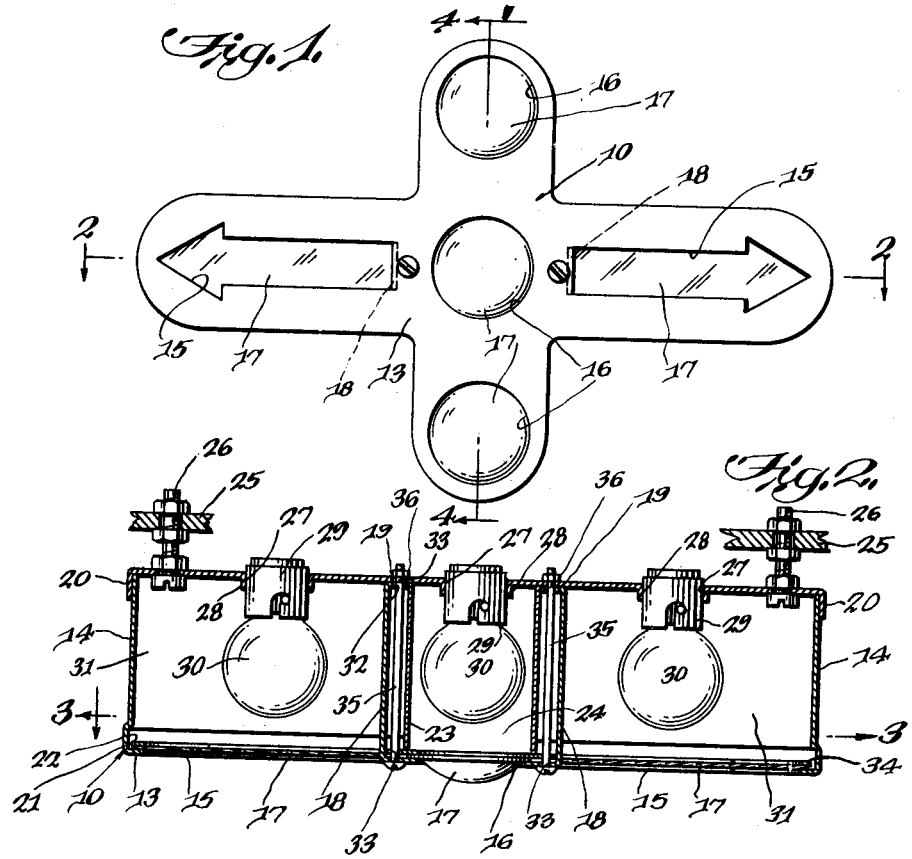
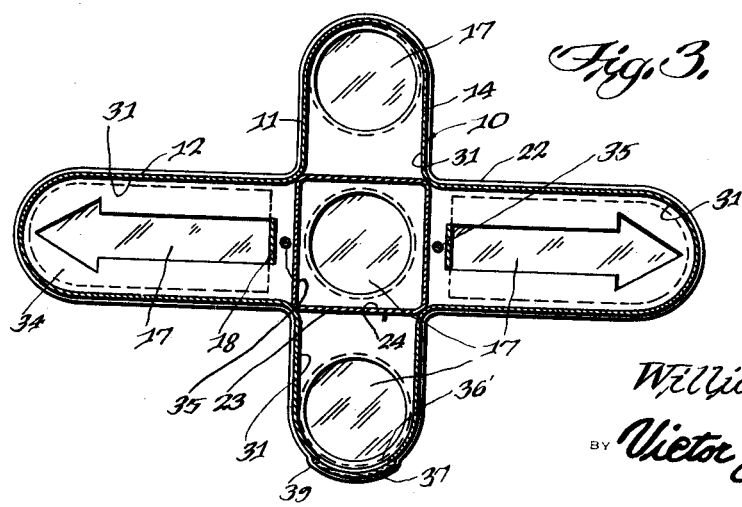
William H. Katt
INVENTOR
BY Victor J. Evans
ATTORNEY Oct. 29, 1929.　　　W. H. KATT　　　1,733,885
VEHICLE SIGNAL DEVICE
Filed Feb. 18, 1927　　2 Sheets-Sheet 2
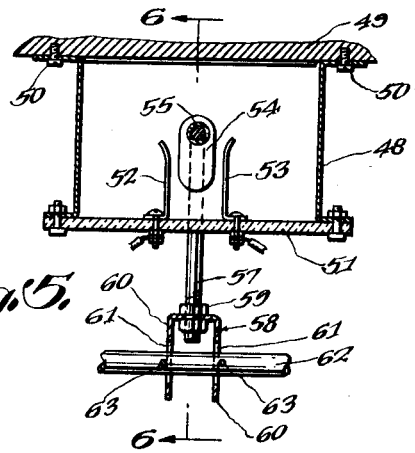
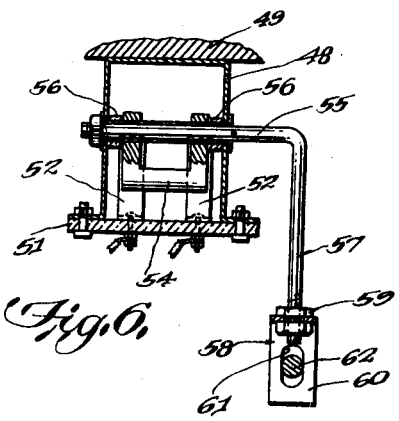
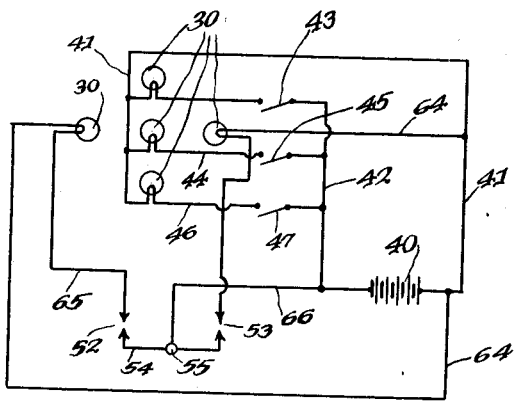
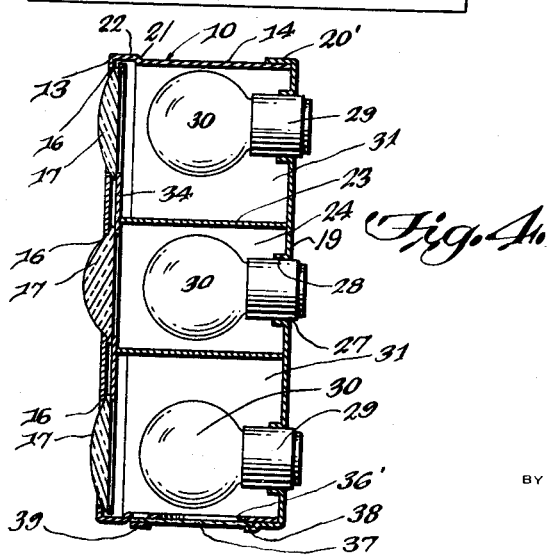
William H. Katt
INVENTOR
BY Victor J. Evans
ATTORNEY Patented Oct. 29, 1929

1,733,885

UNITED STATES PATENT OFFICE

WILLIAM H. KATT, OF CHICAGO, ILLINOIS

VEHICLE SIGNAL DEVICE

Application filed February 18, 1927. Serial No. 169,300.

This invention relates to vehicle signal device and has for its principal object the provision of an improved construction of this character which will be highly efficient in use and economical in manufacture.

Among the several objects of the invention is to provide a signal device constructed to permit convenient and expeditious access to the lighting elements arranged therein.

I am aware of the fact that there are now in commercial use various styles and types of signal devices for indicating the direction of movement of an automobile. These devices with which I am familiar have been found to be impractical due to the fact that it is not convenient to remove or replace the lighting elements therein. It is therefore one of the many objects of this invention to provide a signal device which is not only adaptable for indicating the movement of an automobile but which comprises a back wall associated with the body of the housing in such a manner as to permit removal of the body without detaching the back wall from supported position on a frame of an automobile whereby to expose the lighting elements for removal or replacement.

A still further object of the invention is to provide a signal housing of this character which includes two integral bodies disposed substantially at right angles with respect to each other to provide the required number of compartments within the housing so that the housing will occupy a minimum amount of space when attached to the vehicle.

A still further object of the invention is the simple arrangement for controlling the signal device.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a face elevational view of the invention;

Fig. 2 is a sectional detail view taken substantially on line 2—2 of Fig. 1;

Fig. 3 is a sectional detail view taken substantially on line 3—3 of Fig. 2;

Fig. 4 is a sectional detail view taken substantially on line 4—4 of Fig. 1;

Fig. 5 is a vertical sectional detail view of a controlling switch embodied in the invention;

Fig. 6 is a sectional detail view of the same taken substantially on line 6—6 of Fig. 5; and Fig. 7 is a diagrammatical circuit arrangement embodied in the invention.

Referring more particularly to Figs. 1 to 4 inclusive illustrating the preferred form of construction of my signal device, 10 indicates the signal housing. This housing 10 comprises two integral bodies 11 and 12 arranged substantially at right angles with respect to each other whereby the housing will have the formation of a cross in front elevation. The housing 10 includes a front wall 13 and formed as an integral part of this front wall are the side walls 14 of the bodies 10 and 11.

Formed in the opposite end portions of the body 12 are openings 15 simulating arrows pointing in opposite direction. In the body 11 and at the central juncture between the bodies 11 and 12 are spaced aligned openings 16. These openings and the openings 15 are closed by lenses 17 of different colors to be optionally selected. The material struck from the front wall 17 to provide the openings 15 is bent rearwardly, substantially at right angles to the front walls and these strips 18 have their arrow shaped heads truncated to provide square end portions and the portions adjacent said square end portions are bent inwardly toward each other for reasons hereinafter set forth.

A back wall is indicated at 19 and this back wall is of a shape conforming to the shape of the front wall and has its peripheral edge portions bent to provide lateral flanges 20 which overlap the peripheral edges of the side walls 14. The side walls 14 inwardly of their juncture with the front wall 13 are slightly depressed as at 21 whereby to simulate a flange 22 to correspond in appearance with the flange 20.

Arranged within the housing 10 between the front wall 13 and back wall 19 at the central junction between the bodies 11 and 12 is a tubular section 23 which provides a centrally located compartment 24, the lens closing the opening of the compartment being preferably green.

The back wall 19 is secured to a supporting element 25 of the vehicle through the medium of nut bearing bolts 26 and formed in this back wall are openings 27 and extending around these openings 27 are annular flanges 28 which support the socket structures 29 of lighting bulbs 30.

The tubular section 23 divides the end portions of the bodies 11 and 12 into individual compartments 31 within which the lighting bulbs 30 project, one of said lighting bulbs being arranged in the compartment 24.

When the tubular section 23 is arranged in the housing 10 the back wall 19 is mounted with its flanges 20 overlapping the peripheral edges of the side walls 14. This disposes the portions adjacent the square ends of the strips 18 in abutment with the back wall 19. The square end portions engage the sides of the tubular section 23 and serve to hold the same in position and against turning. Formed in these arrow heads are openings 32 arranged in alignment with openings 33 formed in the back wall 19, front wall 13, and lens supporting plate 34. Projecting through these openings are bolts 35 having threaded end portions adapted to receive nuts 36 whereby when the bolts are disposed in the position shown in Fig. 2 the back wall 19 will be effectively secured to the housing 10.

The lens supporting plate 34 is cross shape in plan view to conform with the shape of the housing 10 and this plate is held in lens supporting position through the medium of the tubular section 23 which is caused to bear the plate against the inner side of the front wall 13 through the medium of the bolts 35 and their respective nuts when the back wall 19 is secured in position.

The lower section of the body 11 has an opening 36 formed therein and normally closing this opening is a transparent plate 37. This plate 37 is supported in closing position with respect to the opening by a lip 38 formed on the bottom flange of the flanges 20 and a strap 39 struck from the bottom of the body 11.

From the above description it will be manifest that to gain access to the interior of the housing it is only necessary to remove the nuts 36 from the bolts 35 at which time the housing 10 can be removed to expose the lighting bulbs 30 without detaching the back plate 10 from its support 25. In addition to this it will be apparent that the signal device is of a simple character and one which can be manufactured at an economical market price.

As herein indicated the lenses may be of different colors and in this connection it is intended that the bottom of the lenses 16 be preferably red as it is intended that this lens be associated with the lower compartment as a tail light and the intermediate of the lens yellow for indicating reverse and the upper of these lenses green to indicate stopping of the vehicle. The lenses crossing the arrow shaped openings may be blue if desired.

In Fig. 7 there is illustrated a diagrammatical circuit arrangement and in this instance it will be seen that the back up light has one side connected to one side of a source of electric energy 40 through the medium of a conductor 41. The other side of the source of electric energy is connected to the other side of this light through the medium of a conductor 42 and it is intended that the circuit to this light be controlled by a switch 43 which may be operated by the reverse peddle of the transmission mechanism of the automobile. The conductor 41 likewise connects the stop light with one side of the source of electrical energy and the other side of the stop light is connected in circuit with the conductor 42 by a conductor 44 and circuit to this stop light is controlled by a switch 45 preferably operated by the brake mechanism of the vehicle. The tail light is connected in circuit with the one side of the source of electric energy through the medium of the conductor 41 and through the medium of a conductor 46 in circuit with the conductor 42 and the circuit to the tail light is preferably controlled by a hand operated switch 47.

The left and right turn lights, indicated by the arrows are controlled by a switch illustrated in Figs. 5 and 6 to be hereinafter described.

This switch includes a body 48 connected to the front axle 49 or other support of the vehicle through the medium of bolts 50. The body 48 includes a bottom plate 51 formed of insulating material and supported by this bottom within the body 48 are oppositely disposed contact fingers 52 and 53 adapted to alternately be engaged by a common contact arm 54. This arm 54 is supported by a rocker arm 55 rotatably supported by the body 50 and insulated therefrom by suitable insulating bushing 56. The rocker arm is substantially L-shaped and the depending portion 57 thereof is connected to a U-shaped clip 58 as at 59. The limb portions 60 of this clip have formed therein vertically extending elongated slots 61 through which the connecting rod 62 of the steering mechanism passes. Carried by this connecting rod 62 are pins 63 which act upon the clip 60 to rock the arm 55 when the connected link is moved longitudinally by the steering mechanism. This movement of the arm will move the arm 54 in contact with the contact finger in the direction of said movement.

In the diagrammatical circuit arrangement it will be seen that corresponding sides of the right and left turn lamps are connected in circuit with the one side of the source of electric energy through the medium of conductors 64 and the other side of the right and left turn lights are connected to the fingers 52 and 53 through the medium of conductors 65. The contact arm 54 is connected to the other side of the source of electric energy through the medium of a conductor 66.

From this it will be seen that a simple switch construction is provided for throwing the left and right turn lamps into circuit with the source of electric energy.

The signal device, when completed will be compact, durable in structure, and as herein indicated the same will be economical in manufacture.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a signal device for vehicles, a body providing a housing formed substantially cross-shaped in front elevation and having an open back, a tubular section arranged centrally in the body for dividing the body into individual compartments, said tubular section being disposed in said housing at substantially the mid portion thereof and having wedging engagement with laterally extending portions of said body at the points of juncture of the cross providing the portions, said body having portions struck inwardly from the front wall providing openings and joined to said front wall adjacent the abutment of said tubular section, said inwardly struck portions bearing against said tubular section to support the same in position, said front wall having other openings provided therein, lenses closing all of said openings, means for supporting said lenses in closing position with respect to the openings, a back wall for closing the open back of said body, means for connecting the back wall to the body, said tubular section engaging said lens supporting means when said back wall is connected to said body whereby to hold said lens supporting means in position, and lighting elements carried by the back wall projecting into the compartments, said openings formed by said inwardly struck portions being substantially arrow-shaped with the arrowheads of said openings pointing in opposite directions.

2. In a signal device for vehicles, a housing substantially cross shape in front elevation having an open back and having a front wall provided with a plurality of openings, a back plate for closing the open back of said housing, a tubular section arranged transversely within the housing tangent to the inner surfaces of the portions of said cross shape housing at the junctures thereof whereby to separate the branches of said housing into individual compartments, means bearing against said tubular member for preventing turning thereof, lighting elements carried by the back wall and projecting into the compartments, means interconnecting the back wall and the front wall of the housing, and lenses providing closures for the openings.

3. In a signal device for vehicles, a housing substantially cross shape in front elevation having an open back and having a front wall provided with a plurality of openings, a back plate for closing the open back of said housing, a tubular section arranged transversely within the housing tangent to the inner surfaces of the portions of said cross shape housing at the junctures thereof whereby to separate the branches of said housing into individual compartments, members formed integral with said front wall and extending rearwardly therefrom into said housing having a portion bearing against said tubular section for retaining the same in position, lighting elements carried by the back wall and projecting into the compartments, means extending through the housing for securing said back wall and the front wall, and lenses of different colors providing closures for the openings certain of said openings being substantially arrow shape with the heads of the arrows extending in opposite directions.

4. In a signal device for vehicles, a body providing a housing formed substantially cross shape in front elevation having an open back, a tubular section arranged centrally within the housing tangent to the points of juncture between the branches of said housing for dividing the housing into individual compartments, said body having a front wall provided with openings, certain of said openings being formed by members struck therefrom in a manner so that portions thereof will remain connected to said front wall whereby said portions may be bent interiorly of said housing to be disposed to bear against said tubular section to retain the same in position, lenses closing said openings, means for supporting said lenses in closing position with respect to the openings, a back wall for closing the open back of the body, and means connecting the back wall, the inwardly disposed portions, and the lens supporting means to the body, and lighting elements carried by said back wall and projecting into said compartments.

5. In a signal device for vehicles, a housing substantially cross shape in front elevation having an open back and a front wall provided with a plurality of openings, lenses closing said openings, a plate having openings formed therein disposed against the inner face of said front wall to dispose the openings therein in alignment with the openings in said front wall, said plate serving to support said lenses in said closing position, a tubular section arranged transversely in the housing tangent to the joining portions of the branches of said housing for dividing said housing into individual compartments, certain of said openings in said front wall being formed substantially arrow shape by bending portions of said front wall inwardly, said inwardly bent portions having the inner ends thereof arranged so as to be substantially square with the extent thereof by cutting away the pointed portions, said square ends being disposed in abutment with said tubular section, a back wall for closing the open back of said housing, said tubular section engaging said lens supporting plate when said back wall is connected to said body whereby to retain said lens supporting plate in position, means for securing said back plate to said front wall of said body, extending through openings in said inwardly bent portions to retain the same in position, and lighting elements carried by said back plate and projecting into said compartments.

6. In a signal device for vehicles, a housing substantially cross shape in front elevation having an open back and having a front wall provided with a plurality of openings, a tubular member arranged within the housing tangent to the joined portions of the branches of said housing whereby to divide the housing into a plurality of individual compartments, lenses closing said openings, a back plate closing the open back of the housing, certain of said openings in said front wall being formed to be substantially arrow shape with the heads thereof extending in opposite directions, said arrow shape openings being formed by bending portions of said front wall inwardly, said inwardly bent portions having the pointed ends thereof cut away to provide square end portions, sections of said inwardly bent portions being bent to be disposed parallel with said front wall and back plate and having openings formed therein disposed in alignment with openings in said front wall and said back plate, said square end portions on said inwardly bent portions being disposed to bear against said tubular member to retain the same in position, connecting elements inserted through said aligned openings in said front wall and said back plate and said sections arranged parallel thereto on said inwardly bent portions for connecting said back plate to the housing and for retaining said sections in position.

7. In a signal device for vehicles, a housing substantially cross shape in front elevation having an open back and having a front wall provided with a plurality of openings, a tubular member arranged within the housing tangent to the joined portions of the branches of said housing whereby to divide the housing into a plurality of individual compartments, lenses closing said openings, a back plate closing the open back of the housing, certain of said openings in said front wall being formed to be substantially arrow shape with the heads thereof extending in opposite directions, said arrow shape openings being formed by bending portions of said front wall inwardly, said inwardly bent portions having the pointed ends thereof cut away to provide square end portions, sections of said inwardly bent portions being bent to be disposed parallel with said front wall and back plate and having openings formed therein disposed in alignment with openings in said front wall and said back plate, said square end portions on said inwardly bent portions being disposed to bear against said tubular member to retain the same in position, connecting elements inserted through said aligned openings in said front wall and said back plate and said sections arranged parallel thereto on said inwardly bent portions for connecting said back plate to the housing and for retaining said sections in position, and lighting elements carried by the back plate and projecting into said compartments.

8. In a signal device for vehicles, a housing substantially cross shape in front elevation having an open back and having a front wall provided with a plurality of openings certain of said openings being substantially arrow shape and being formed by bending portions of said front wall inwardly of said housing substantially at right angles with respect to said front wall, the outer end sections of said inwardly bent portions having the pointed ends thereof cut away and being bent inwardly toward each other and having openings formed therein disposed in alignment with other openings formed in the front wall, a tubular member disposed with portions thereof tangent to the points of juncture of the branches of said cross shape housing whereby to separate said branches of said housing into individual compartments, said sections of said inwardly bent portion extending toward each other being against said tubular member to retain the same in position, lenses closing said first named openings in said front wall, a back plate for closing the open back of said housing and being arranged in abutment with said sections of said inwardly bent member extending toward each other, said back plate having openings formed therein in alignment with the openings in said sections, connecting elements inserted through other openings in said front wall and through said aligned openings in said sections and said back plate for connecting the back plate to the housing, light elements carried by the back plate and projecting into the compartments, a plate arranged to the rear of the front wall and having openings formed therein adapted for registration with the openings of the front wall closed by said lenses, said plate serving to support said lenses in said closed portion, said tubular member bearing against said last named plate to hold said plate in position when said back plate is connected to said housing.

In testimony whereof I affix my signature.

WILLIAM H. KATT.